United States Patent
Baek et al.

(10) Patent No.: US 9,350,001 B2
(45) Date of Patent: May 24, 2016

(54) BATTERY PACK FOR A LITHIUM POLYMER BATTERY

(75) Inventors: Woon-Seong Baek, Yongin-si (KR); Kyung-Won Seo, Yongin-si (KR); Jong-Wook Yoon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 69 days.

(21) Appl. No.: 12/959,663

(22) Filed: Dec. 3, 2010

(65) Prior Publication Data

US 2012/0009443 A1 Jan. 12, 2012

Related U.S. Application Data

(60) Provisional application No. 61/362,973, filed on Jul. 9, 2010.

(51) Int. Cl.
*H01M 10/04* (2006.01)
*H01M 2/10* (2006.01)
*H01M 2/04* (2006.01)
*H01M 10/42* (2006.01)

(52) U.S. Cl.
CPC .......... *H01M 2/1061* (2013.01); *H01M 2/0404* (2013.01); *H01M 10/425* (2013.01)

(58) Field of Classification Search
USPC ........................................................... 429/7
See application file for complete search history.

(56) References Cited

U.S. PATENT DOCUMENTS

| 6,451,474 | B1 * | 9/2002 | Kozu et al. | 429/100 |
| 2005/0112415 | A1 | 5/2005 | Takeshita et al. | |
| 2008/0118825 | A1 * | 5/2008 | Yoon | 429/122 |
| 2009/0081485 | A1 | 3/2009 | Heo | |
| 2009/0092896 | A1 | 4/2009 | Koh et al. | |
| 2009/0111018 | A1 | 4/2009 | Park et al. | |
| 2009/0191448 | A1 | 7/2009 | Yamamoto et al. | |
| 2009/0258285 | A1 | 10/2009 | Kim | |

(Continued)

FOREIGN PATENT DOCUMENTS

| EP | 1835556 | 9/2007 |
| EP | 2284931 | 2/2011 |

(Continued)

OTHER PUBLICATIONS

European Search Report issued on Nov. 7, 2011 in connection with European Patent Application Serial No. 11 15 1593.
Korean Notice of Allowance issued on Jun. 12, 2012 by KIPO in connection with Korean Application No. 10-2011-0003150 which corresponds to U.S. Appl. No. 61/362,973 as its priority document and Request for Entry of the Accompanying Office Action.

(Continued)

*Primary Examiner* — Jacob Marks
(74) *Attorney, Agent, or Firm* — Robert E. Bushnell, Esq.

(57) ABSTRACT

A polymer battery pack assembly comprising a mounting frame having a first cavity defining a first mounting location and a second cavity defining a second mounting location, the first and second cavities being separated from each other; a top case mounted on the second mounting location, the top case having a third cavity defining a third mounting location; a lithium polymer battery cell mounted within the first mounting location, the battery cell having a positive tap and a negative tap extending beyond the first cavity towards the second mounting location; and a protection circuit module mounted in the third mounting location, the protection circuit module being electrically connected to the positive tap and the negative tap when the top case is mounted to the mounting frame such that the protection circuit module fits into said second cavity.

7 Claims, 6 Drawing Sheets

(56) References Cited

U.S. PATENT DOCUMENTS

2010/0092861 A1   4/2010   Kim
2010/0178536 A1   7/2010   Kwak et al.

FOREIGN PATENT DOCUMENTS

| | | | |
|---|---|---|---|
| EP | 2378591 | | 10/2011 |
| JP | 2007-157452 | * | 12/2005 |
| JP | 2010-073510 | A | 4/2010 |
| KR | 10-2005-0037366 | A | 4/2005 |
| KR | 10-2008-0069376 | | 7/2008 |
| KR | 10-2009-0027393 | | 3/2009 |
| KR | 1020090031158 | A | 3/2009 |
| KR | 1020100041689 | | 4/2010 |

OTHER PUBLICATIONS

Korean Office Action issued on Jun. 12, 2012 by KIPO in connection with Korean Application No. 10-2011-0003150 and Request for Entry of the Accompanying Office Action.

Korean Registration Determination Certificate dated Dec. 3, 2012 in connection with Korean Patent Application No. 10-2011-0003150 and Request for Entry of the Accompanying Office Action.

EPO Examination Report issued by the European Patent Office on Oct. 9, 2013 in the European Patent Application No. 11 151 593.8.

EPO Examination Report issued by the European Patent Office on Aug. 21, 2015 in the examination of the European Patent Application No. 11 151 593.8.

* cited by examiner

BATTERY PACK FOR A LITHIUM POLYMER BATTERY

CROSS-REFERENCE TO RELATED APPLICATION

This application claims priority to and the benefit of Provisional Patent Application No. 61/362,973 filed in the U.S. Patent and Trademark Office on Jul. 9, 2010, the entire contents of which are incorporated herein by reference.

BACKGROUND OF THE INVENTION

1. Field of the Invention

One or more embodiments of the present invention relate to a polymer battery pack in which a top case is coupled to a lithium polymer battery cell molded by a mounting frame.

2. Description of the Related Art

In general, secondary batteries may be charged or discharged, unlike a primary battery, which may not be charged. Secondary batteries are used as energy sources of small-sized devices, such as a cellular phone, a laptop computer, and a camcorder, and medium-large sized devices such as an electric car, a hybrid electric car, an electric bicycle, and a uninterruptible power supply (UPS).

A lithium secondary batteries is an example of a secondary battery. The lithium secondary battery may be classified into a can-type secondary battery, which has a cylindrical or square shape according to the shape of a case accommodating an electrode assembly, and a pouch-type secondary battery having flexibility.

Secondary batteries may be classified into a liquid electrolyte battery and a polymer electrolyte battery according to the type of electrolyte. In general, a battery using a liquid electrolyte is referred to as a lithium ion battery, and a battery using a polymer electrolyte is referred to as a polymer battery. Lithium-ion polymer batteries, polymer lithium ion, or more commonly lithium polymer batteries (abbreviated Li-poly, Li-Pol, LiPo, LIP, PLI or LiP) are rechargeable batteries (secondary cell batteries).

Many cells sold today as polymer batteries are pouch cells. Unlike lithium-ion cylindrical cells, which have a rigid metal case, pouch cells have a flexible, foil-type (polymer laminate) case. In cylindrical cells, the rigid case presses the electrodes and the separator onto each other; whereas in polymer cells this external pressure is not required because the electrode sheets and the separator sheets are laminated onto each other.

Since individual pouch cells have no strong metal casing, by themselves they are over 20% lighter than equivalent cylindrical cells. However, all Li-Ion cells expand at high levels of SOC (State of Charge); if uncontained, this may result in delamination, and reduction of reliability and cycle life; the case of cylindrical cells provides that containment, while pouch cells, by themselves, are not contained. Therefore, to achieve the rated performance, a battery composed of pouch cells must include an overall, strong, external casing to retain its shape.

Conventionally, a battery cell accommodating an electrode assembly is coupled to a protection circuit module (PCM). A top case is installed on the battery cell coupled to the PCM. In addition, the battery cell is inserted into a film-type outer case by using a double-sided tape, and a label is attached on an outer surface of the outer case. A battery pack is manufactured through the above-described processes.

However, a conventional battery pack requires a large number of processes and causes a severe poor distribution due to a worker. Insert injection process performed during a manufacturing process of a battery pack may affect the PCM and a positive temperature coefficient (PTC) element.

SUMMARY OF THE INVENTION

According to one or more embodiments of the present invention, there is provided a polymer battery pack capable of easily coupling a top case to a lithium polymer battery cell molded by a mounting frame.

An exemplary embodiment of the present invention provides a polymer type battery having a polymer cell a top case, a frame having a first area for accommodating the polymer cell and a second area for locating the top case wherein the second area is separate from the first area, and first and second engaging elements coupling the top case to the frame.

The polymer type battery having a protection circuit module located in the top case, and an electrode tap extends from the polymer cell beyond the frame to the protection circuit module.

The first engaging element having one of a fixing slot or a fixing tab on the top case, and the second engaging element having a correspond one of fixing tab or a fixing slot on the frame, the fixing slot receiving the fixing tab when the top case is coupled to the frame.

The polymer type battery having a pair of channels formed in opposite end sidewalls of the top case and a corresponding pair of runners disposed in the second area and formed in opposite end sidewalls thereof, the runners slidably engaging the channels when the top case is mounted on frame.

The first engaging element having a plurality of fixing tabs on the top case, and the second engaging element having a corresponding plurality fixing slots on the frame, the fixing slot receives the fixing tab when the top case is coupled to the frame, the fixing tabs and fixing slots being asymmetrically disposed with respect to a central axis of the top case and frame.

An exemplary embodiment of the present invention provides a polymer battery pack assembly having a mounting frame having a first cavity defining a first mounting location and a second cavity defining a second mounting location, the first and second cavities being separated from each other; a top case mounted on the second mounting location, the top case having a third cavity defining a third mounting location; a polymer battery cell mounted within the first mounting location, the battery cell having a positive tap and a negative tap extending beyond the first cavity towards the second mounting location; a first engaging member formed in the mounting frame, and a second engaging member formed in the top case; and a protection circuit module mounted in the third mounting location, the protection circuit module being electrically connected to the positive tap and the negative tap when the top case is mounted to the mounting frame such that the protection circuit module fits into said second cavity.

The polymer battery pack assembly having at least two fixing tabs and at least two corresponding fixing slots, the fixing slots receiving the fixing tabs when the top case is mounted on the second mounting location. The fixing tabs protrude from a sidewall of the second mounting location and the fixing slots are formed in a sidewall of the top case, or alternatively the fixing tabs protrude from a sidewall of the top case and the fixing slots are formed in a sidewall of the second mounting location.

The polymer battery pack assembly having a pair of channels formed at opposite ends of the second cavity and a corresponding pair of runners slidably engaging said channels when the top case is mounted on the second mounting location.

The polymer battery pack assembly having first and second reinforcement members formed in a sidewall of the second mounting location, the first and second reinforcement members defining mounting slots for receiving corresponding ones of the positive and a negative taps when the battery cell is mounted within the first mounting location.

The polymer battery pack assembly having an outer case having a pouch shape to receive the mounting frame, the outer case providing added protection and strength to the batter pack assembly, and a protection film cover for covering and molding the outer case.

An exemplary embodiment of the present invention provides a mounting frame for a polymer battery pack assembly, the mounting frame having a first mounting location having a first cavity for receiving a battery cell, the battery cell having a positive tap and a negative tap extending beyond the first cavity; a second mounting location having a second cavity, the first and second cavities being separated from each other; a top case for covering the second mounting location, the top case having a third cavity defining a third mounting location for receiving a protection circuit module, when the top case is fixed to the second mounting location the protection circuit module fitting into said second cavity and being electrically connected to the positive tap and the negative tap, and first engaging elements of the top case being coupled to second engaging elements of the frame.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
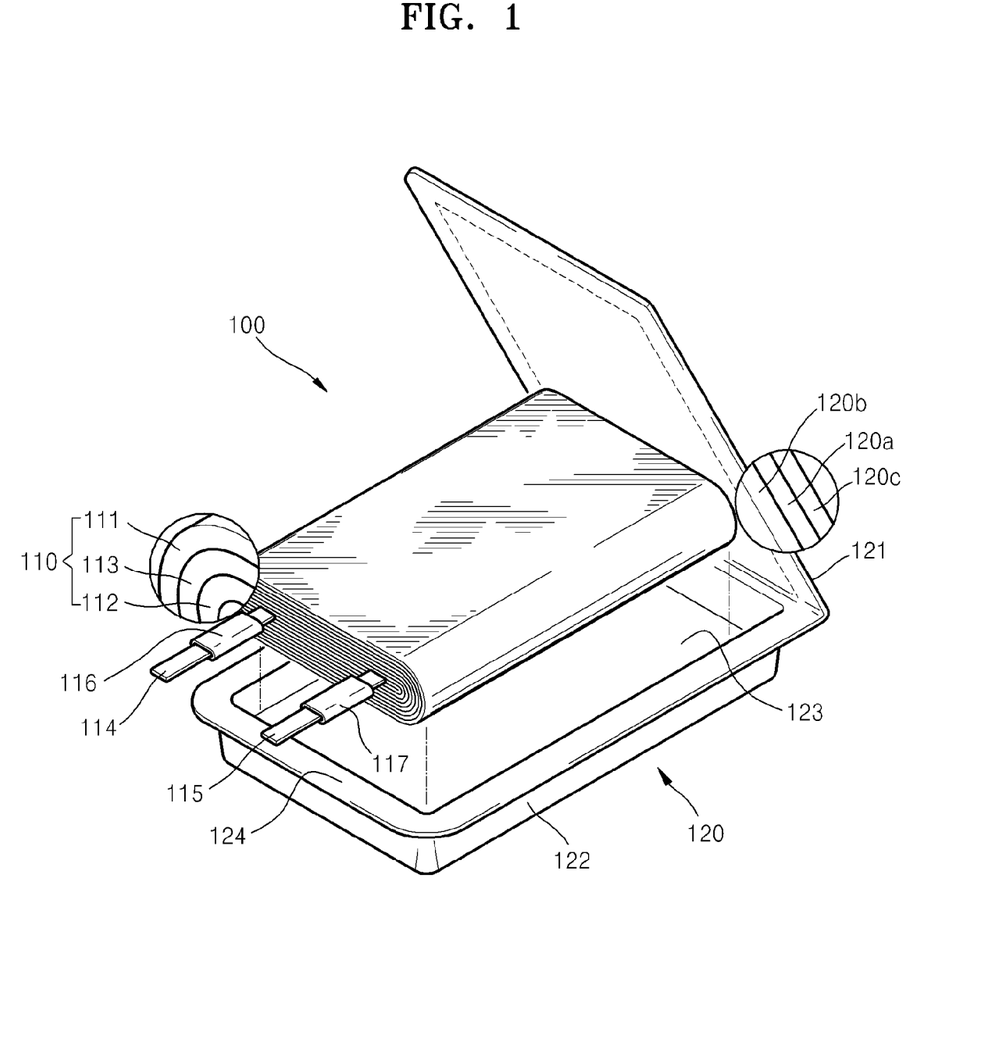
FIG. 1 is an exploded perspective view illustrating a polymer battery cell, according to an embodiment of the present invention.

FIG. 1 is an exploded perspective view illustrating a polymer battery cell 100, according to an embodiment of the present invention.

Referring to FIG. 1, the polymer battery cell 100 includes an electrode assembly 110 and a pouch 120 for accommodating the electrode assembly 110. The electrode assembly 110 includes a positive electrode plate 111, a negative electrode plate 112, and a separator 113 interposed between the positive electrode plate 111 and the negative electrode plate 112.

A positive electrode tap 114 is electrically connected to the positive electrode plate 111 and a positive electrode insulating tape 116 is wound on the positive electrode tap 114. A negative electrode tap 115 is electrically connected to the negative electrode plate 112 and a negative electrode insulating tape 117 is wound on the negative electrode tap 115.

The pouch 120 is a flexible pouch type case. The pouch 120 includes an upper case 121 and a lower case 122 coupled to the upper case 121. At least one surface of the upper case 121 and at least one surface of the lower case 122 are coupled to each other as one body. The pouch 120 is formed of a triple-layered structure including a metal foil 120a and insulating films 120b and 120c that are attached on opposite sides of the metal foil 120a, but the present invention is not limited thereto.

The electrode assembly 110 is disposed in a space portion 123 formed inside the pouch 120. The positive electrode insulating tape 116 and the negative electrode insulating tape 117 are thermally adhered to a sealing surface 124. Ends of the positive electrode tap 114 and the negative electrode tap 115 are exposed outside of the pouch 120.

Figure 2:
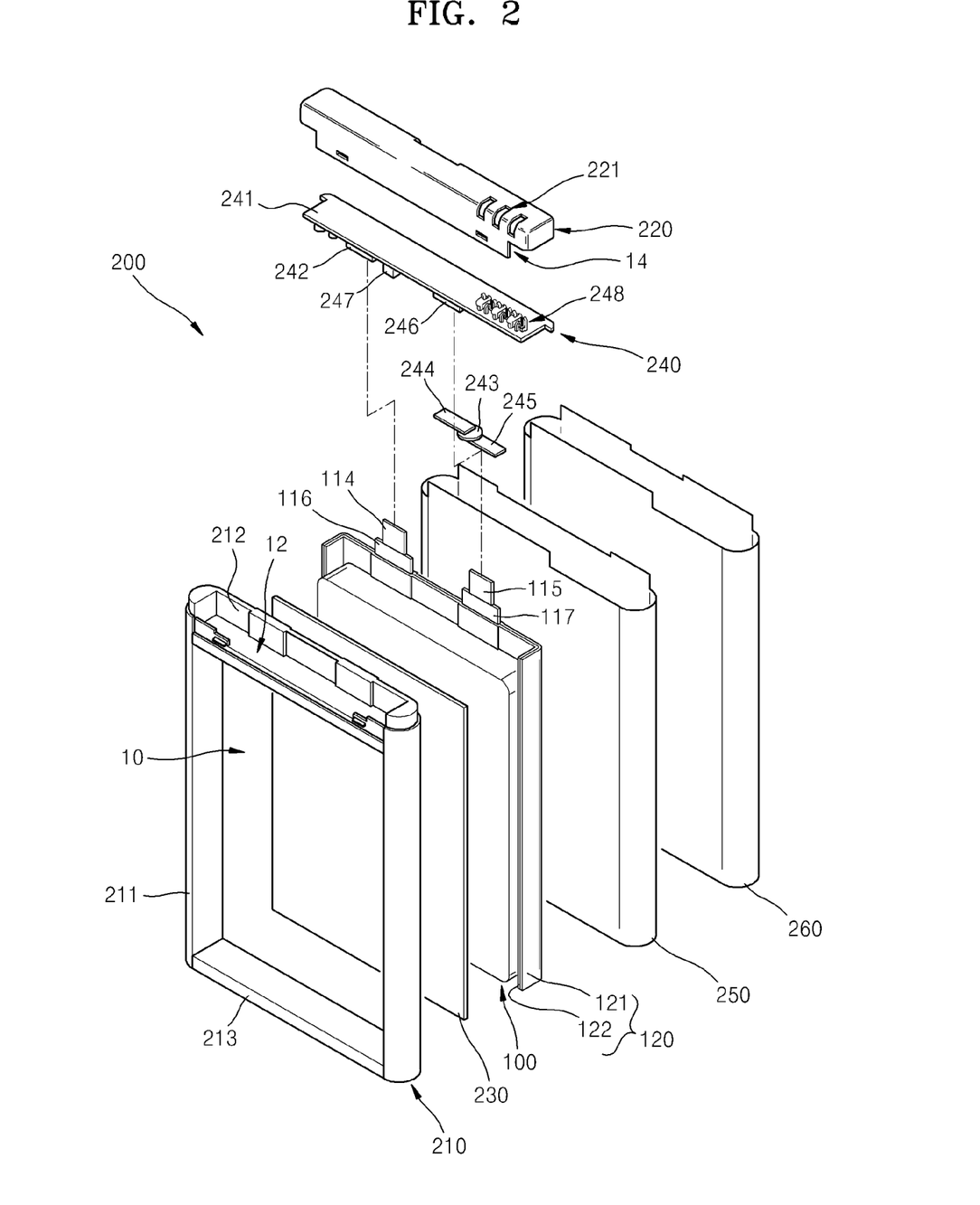
FIG. 2 is an exploded perspective view illustrating a battery pack, according to an embodiment of the present invention.
Figure 3:
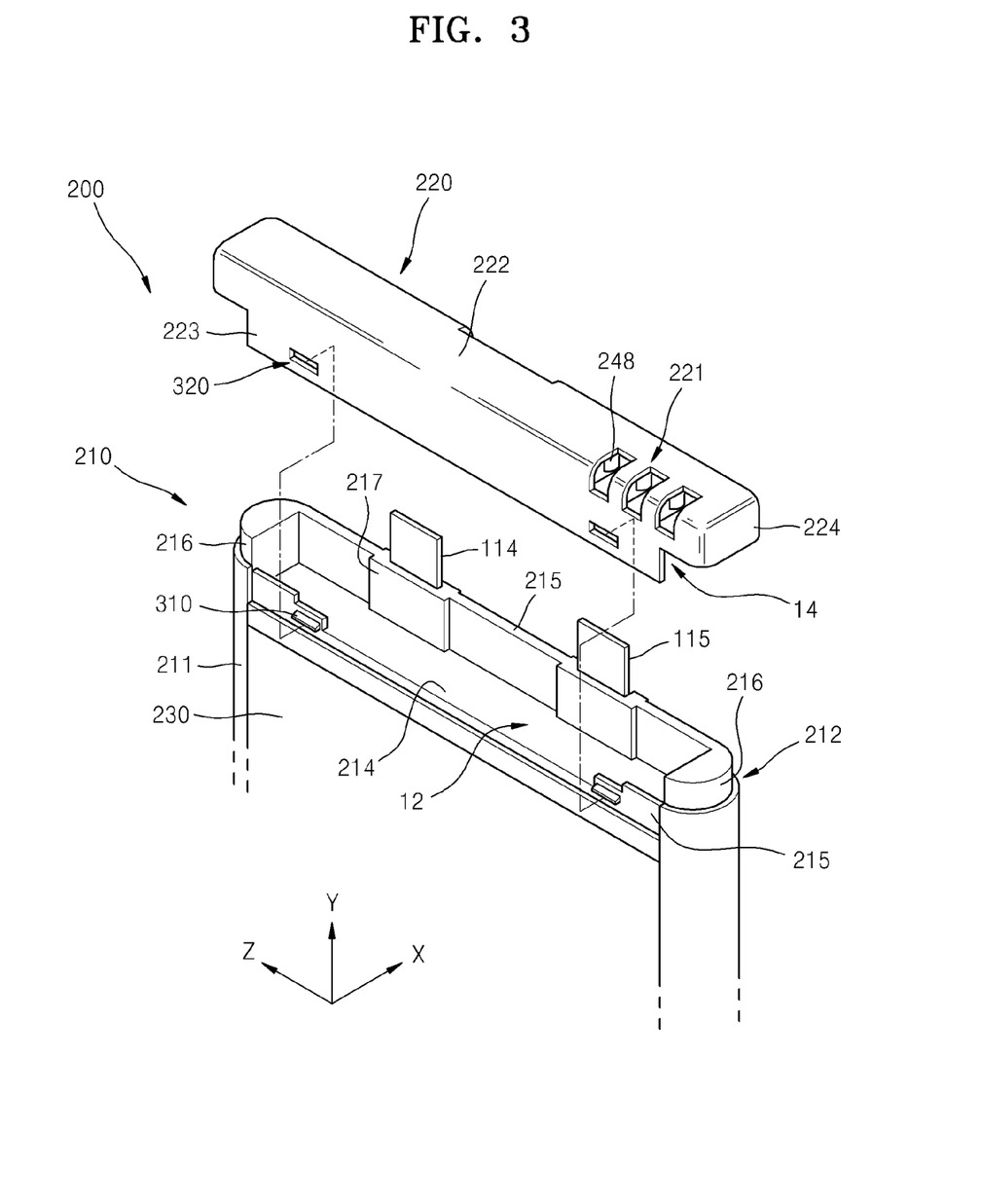
FIG. 3 is an exploded perspective view illustrating a part of the battery pack of FIG. 2.

FIG. 2 is an exploded perspective view illustrating a battery pack 200, according to an embodiment of the present invention. FIG. 3 is an exploded perspective view illustrating a part of the battery pack 200 of FIG. 2.

Like reference numerals in the following description denote like elements in the previous description.

Referring to FIGS. 2 and 3, the battery pack 200 includes the battery cell 100, an mounting frame 210, and a top case 220.

The battery cell 100 includes the pouch 120 accommodating the electrode assembly 110 (see FIG. 1). The ends of the positive electrode tap 114 and the negative electrode tap 115 are exposed outside of the pouch 120. The ends of the positive electrode tap 114 and the negative electrode tap 115 are disposed at a side of the top case 220. Since the pouch 120 is a flexible pouch-type case, after the electrode assembly 110 is accommodated in the pouch 120, the pouch 120 may be freely folded.

The battery cell 100 is partially molded by the mounting frame 210. The mounting frame 210 comprises a first portion 211 covering side walls of the battery cell 100, a second portion 212 covering an upper end portion of the battery cell 100 corresponding to the exposed ends of the positive electrode tap 114 and the negative electrode tap 115, and a third portion 213 opposite to the second portion 212 and covering a lower portion of the battery cell 100.

The first portion 211, the second portion 212, and the third portion 213 are formed as one body forming includes a cavity 10 for receiving the body of the battery cell 100. The mounting frame 210 including the first portion 211, the second portion 212, and the third portion 213 is formed to mold at least a part of an outer surface of the battery cell 100 and is formed by injection-molding using a polymer resin.

Alternatively, the mounting frame 210 may be formed to entirely mold the battery cell 100, except for the exposed ends of the positive electrode tap 114 and the negative electrode tap 115, but the present invention is not limited to any one injection-molded structure.

At this time, for coupling between the mounting frame 210 and the top case 220, at least a part of the upper end portion of the battery cell 100 corresponding to the exposed ends of the positive electrode tap 114 and the negative electrode tap 115 may be injection molded.

A label 230 may be disposed between the outer surface of the battery cell 100 and the mounting frame 210. The label 230 is adhered to a front surface or a rear surface of the battery cell 100 by using a double-sided tape or an adhesive solvent. The label 230 may preferably be adhered to the outer surface of the battery cell 100 before the mounting frame 210 is disposed on the battery cell 100. The label 230 is adhered to the outer surface of the battery cell 100 in order to display information about the battery cell 100.

A protection circuit module 240 is disposed in a cavity 12 formed in second portion 212 and a cavity 14 formed in the top case 220, when the top case 220 is mounted on the mounting frame 210.

The protection circuit module 240 includes a circuit board 241, a plurality of electronic elements 242 mounted on the circuit board 241, and a positive temperature coefficient (PTC) element 243 functioning as a safety element.

The circuit board 241 includes a printed circuit board (PCB) in which at least one circuit pattern layer is stacked. The electronic elements 242 include an integrated circuit (IC) chip, a field effect transistor (FET), a resistor, a capacitor, etc.

The positive temperature coefficient (PTC) element 243 includes conductive particles and a polymer. A first metal thin plate 244 is disposed on the positive temperature coefficient (PTC) element 243, and a second metal thin plate 245 is disposed under the positive temperature coefficient (PTC) element 243. The first metal thin plate 244 is electrically connected to a first electrode terminal 246 disposed in the circuit board 241, and the second metal thin plate 245 is electrically connected to the negative electrode tap 115. Meanwhile, the positive electrode tap 114 is electrically connected to a second electrode terminal 247 disposed in the circuit board 241.

In the present invention, the first electrode terminal 246 has a negative electrode, similar to the negative electrode tap 115, and the second electrode terminal 247 has a positive electrode, similar to the positive electrode tap 114. However, electrical connections between the electrode taps 114 and 115 and the electrode terminals 246 and 247 may be modified into any of various structures.

A plurality of external terminals 248 electrically connected to the first electrode terminal 246 and the second electrode terminal 247 are formed on the circuit board 241.

The protection circuit module 240 is accommodated in the cavity 14 in the top case 220. When the protection circuit module 240 is accommodated in the top case 220, the top case 220 may be coupled to the upper end portion of the second portion 212 of mounting frame 210. A plurality of external terminal holes 221 through which the external terminals 248 may be exposed are formed in the top case 220.

The top case 220 protects the protection circuit module 240 against an external impact and prevents the protection circuit module 240 from being circuit-shorted. As such, the protection circuit module 240 and the top case 220 are coupled to each other so as to be formed as one body. The top case 220 may be formed as a shaped body including a polymer resin such as polycarbonate.

Meanwhile, the battery cell 100 partially molded by the mounting frame 210 may be installed in an outer case 250 that may protect the battery cell 100 and may reinforce the strength of the battery cell 100. The outer case 250 may be a pouch to which an adhesive is adhered. In addition, the outer case 250 may be molded by a protection film cover 260.

FIG. 3 illustrates the battery pack 200 of FIG. 1 wherein the mounting frame 210 and the top case 220 in an uncoupled state.

Referring to FIG. 3, the mounting frame 210 is formed on a part of the outer surface of the battery cell 100 and is formed by injection-molding using a polymer resin. The label 230 is interposed between the battery cell 100 and the mounting frame 210.

The mounting frame 210 includes the second portion 212, which is coupled to the top case 220. The second portion 212 of mounting frame 210 is formed so as to cover the upper end portion of the battery cell 100, in which ends of the positive electrode tap 114 and the negative electrode tap 115 are exposed. The second portion 212 of mounting frame 210 may be injection-molded together with the first portion 211 covering the side walls of the battery cell 100.

The second portion 212 of the mounting frame 210 includes the cavity 12 defined by a bottom portion 214 covering the upper end portion of the battery cell 100, first side walls 215 extending in a direction perpendicularly to the bottom portion 214 from long side edges of the bottom portion 214, and second side walls 216 extending in the direction perpendicularly to the bottom portion 214 from short side edges of the bottom portion 214.

The first side walls 215 are respectively formed to a predetermined height from the long side edges of the bottom portion 214, and the height and shape thereof are not limited thereto. The second side walls 216 are respectively formed to a predetermined height from the short side edges of the bottom portion 214, and the height and shape thereof are not limited thereto.

A reinforcement portion 217 is formed to protrude in the first side wall 215 that correspond to the positive and negative electrode taps 114 and 115 so that movement of the positive electrode tap 114 and the negative electrode tap 115 is reduced when the ends of the positive electrode tap 114 and the negative electrode tap 115, which are electrically connected to the electrode assembly 110 (see FIG. 1) of the battery cell 100, are exposed.

A plurality of fixing tabs 310 are formed in the first side walls 215. The fixing tabs 310 are formed to protrude from outer surfaces of the first side walls 215 in a direction (x-axis direction) perpendicular to that in which the battery cell 100 is vertically positioned (y-axis direction). The plurality of fixing tabs 310 are formed in a lengthwise direction (z-axis direction) of the first side walls 215. The fixing tabs 310 may be formed in both first side walls 215.

Although the fixing tabs 310 are formed in the first side walls 215 in the present embodiment, the present invention is not limited thereto. That is, the fixing tabs 310 may be formed in the second side walls 216 or in both the first side walls 215 and the second side walls 216.

The fixing tabs 310 formed in one first side wall 215 may be formed symmetrically with those formed in the other first side wall 215. Alternatively, the fixing tabs 310 may be formed asymmetrically in order to easily determine a coupling orientation when coupling the top case 220 to the fixing tabs 310. However, the present invention is not limited thereto. That is, the fixing tabs 310 may be alternately formed in vertical and horizontal directions in both the first side walls 215.

The top case 220 includes a top portion 222 in which the plurality of external terminal holes 221 are formed, first side walls 223 formed from long side edges of the top portion 222 at right angles toward the battery cell 100, and second side walls 224 formed from short side edges of the top portion 222 at right angles toward the battery cell 100. The first side wall 223 and the second side wall 224 extend from edges of the top portion 222 and are formed as one body, but the height and size thereof are not limited thereto.

A plurality of fixing slots 320 are formed in the first side walls 223 of the top case 220, wherein the fixing slots 320 may be coupled to the fixing tabs 310. The fixing slots 320 are formed to correspond to the fixing tabs 310 formed in the first side walls 215 of the mounting frame 210 when the battery cell 100 molded by the mounting frame 210 and the top case 220 are coupled to each other. Thus, in the present invention, the plurality of fixing slots 320 are formed in the first side walls 223 of the top case 220 in a lengthwise direction (z-axis direction) of the first side walls 223.

Thus, when the fixing tabs 310 formed in the second side walls 215 of the mounting frame 210 are inserted in a vertical direction (y-axis direction) into the fixing slots 320 formed in the first side walls 223 of the top case 220, coupling between the battery cell 100 molded by the mounting frame 210 and the top case 220 may be improved.

Meanwhile, the fixing tabs 310 may be formed by injection-molding using a guide groove when the mounting frame 210 is formed. Similarly, the fixing slots 320 may also be formed using a guide pin.

Figure 4:
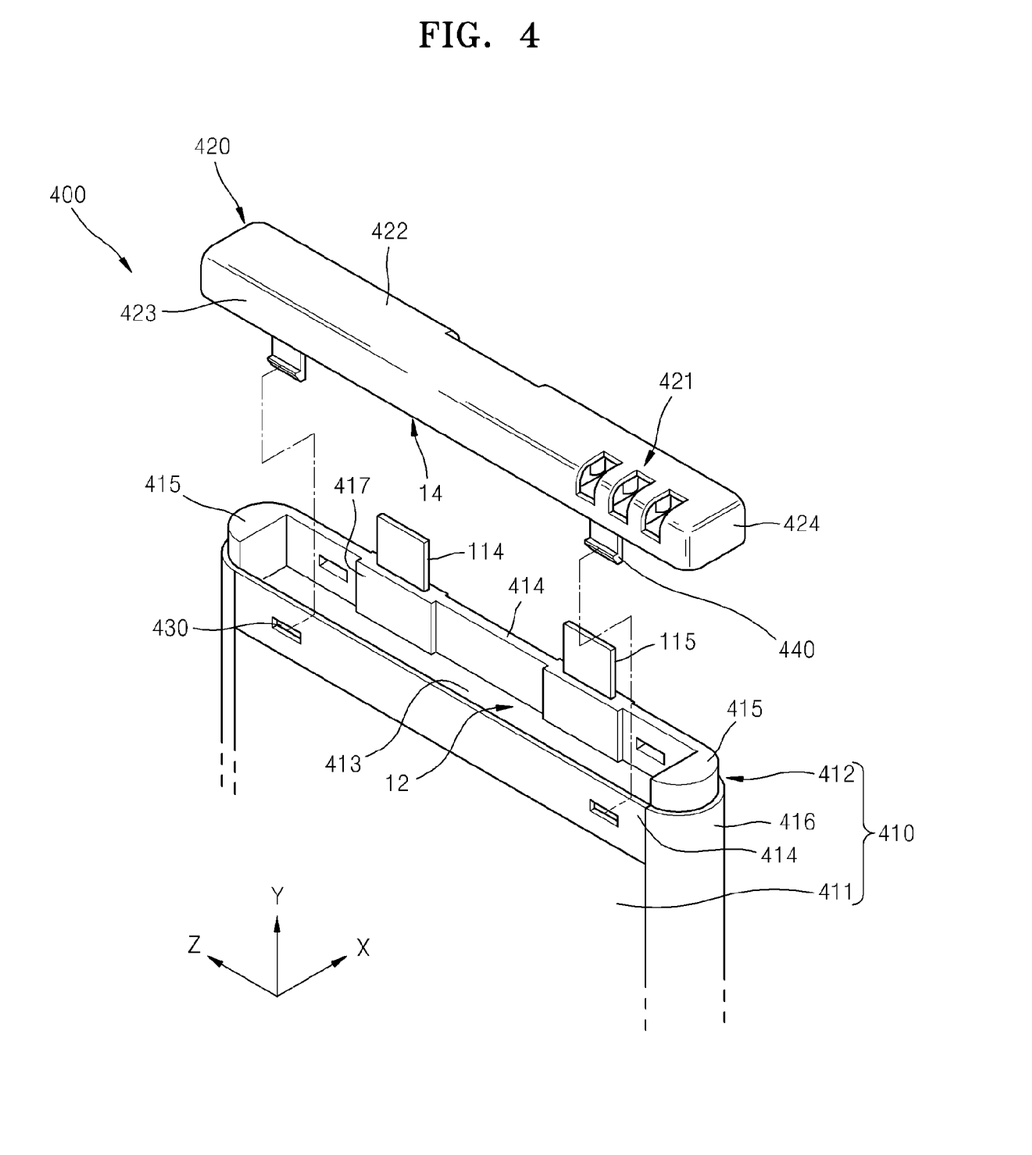
FIG. 4 is an exploded perspective view illustrating a part of a battery pack, according to another embodiment of the present invention.

FIG. 4 is an exploded perspective view illustrating a part of a battery pack 400, according to another embodiment of the present invention.

Hereinafter, only parts related to the main characteristics of the embodiments of the present invention will be mainly described.

Referring to FIG. 4, the battery cell 100 (see FIG. 1) is molded by an outer frame 410 formed by injection-molding using a polymer resin. The outer frame 410 includes a first portion 411 covering the front, rear, and side surfaces of the battery cell 100 and a second portion 412 covering the upper end portion of the battery cell 100. The second portion 412 of the outer frame 410 is formed to cover the upper end portion of the battery cell 100 in which the ends of the positive electrode tap 114 and the negative electrode tap 115 are exposed.

The second portion 412 of the outer frame 410 includes a cavity 12 defined by a bottom portion 413 covering the upper end portion of the battery cell 100, first side walls 414 formed in a direction (y-axis direction) perpendicular to the bottom portion 413 and formed from long side edges of the bottom portion 413, and second side walls 415 formed in the direction (y-axis direction) perpendicular to the bottom portion 413 and formed from short side portions of the bottom portion 413.

A reinforcement portion 417 is formed to protrude in the first side wall 414 that correspond to the positive and negative electrode taps 114 and 115 so that movement of the positive electrode tap 114 and the negative electrode tap 115 is reduced when the ends of the positive electrode tap 114 and the negative electrode tap 115, which are electrically connected to the electrode assembly 110 (see FIG. 1) of the battery cell 100, are exposed.

A plurality of fixing slots 430 may be formed in both first side walls 414 in a lengthwise direction (z-axis direction) of the first side walls 414.

The fixing slots 430 formed in one first side wall 414 may be formed symmetrically with those formed in the other first side wall 414. Alternatively, the fixing slots 430 may be formed asymmetrically in order to easily determine a coupling orientation when coupling the top case 420 to the fixing slots 430. However, the present invention is not limited thereto. That is, the fixing slots 430 may be alternately formed vertically and horizontally in both the first side walls 414.

The top case 420 includes a top portion 422 in which a plurality of external terminal holes 421 are formed, first side walls 423 formed from long side edges of the top portion 422 at right angles toward the battery cell 100, and second side walls 424 formed from short side edges of the top portion 422 at right angles toward the battery cell 100.

A plurality of fixing tabs 440 are formed in the top case 420, wherein the fixing tabs 440 may be coupled to the fixing slots 430. The fixing tabs 440 are formed to correspond to the fixing slots 430 formed in the first side walls 414 of the outer frame 410. The plurality of fixing tabs 440 are formed to extend in a y-axis direction from the first side walls 423 of the top case 420.

Figure 6:
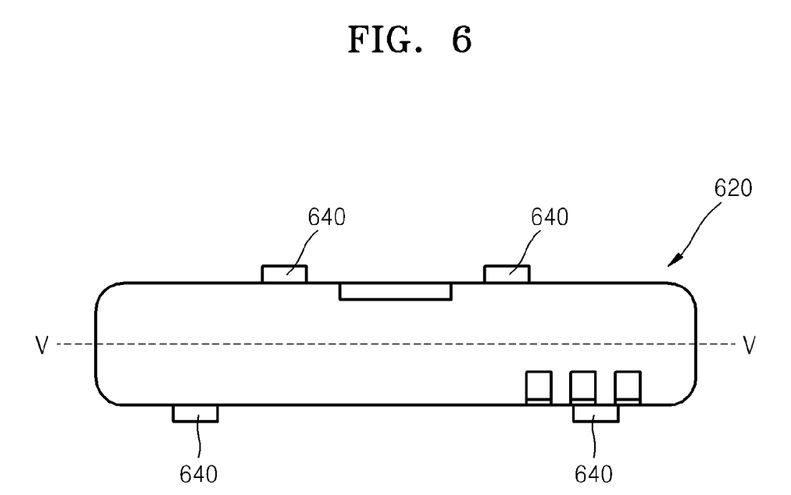
FIG. 6 is a plane view illustrating a top case of FIG. 4, according to another embodiment of the present invention.
Figure 7:
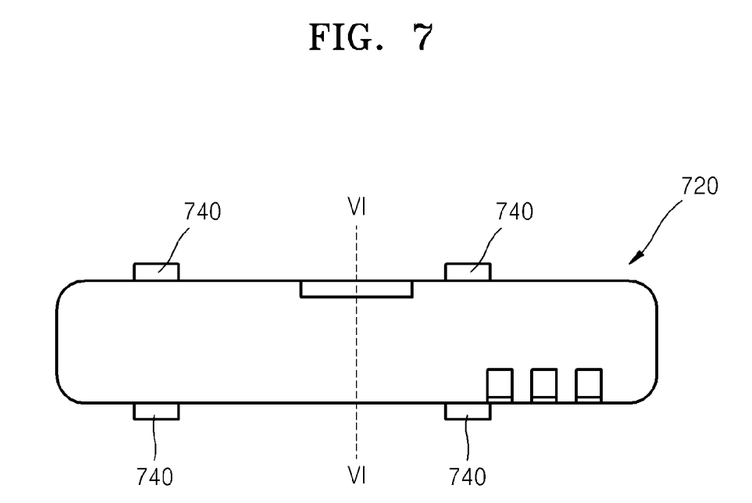
FIG. 7 is a plane view illustrating a top case of FIG. 4, according to another embodiment of the present invention.

As described above, the plurality of fixing tabs 440 may be formed asymmetrically with each other so as to corresponding to the fixing slots 430 when the fixing slots 430 are alternately formed in vertical and horizontal directions with respect to the outer frame 410. For example, as illustrated in FIG. 6, a plurality of fixing tabs 640 may be formed asymmetrically with each other in a horizontal direction (central axis line V-V) with respect to a top case 620. Alternatively, as illustrated in FIG. 7, a plurality of fixing tabs 740 may be formed asymmetrically with each other in a vertical direction (central axis line VI-VI) with respect to a top case 720.

Referring back to FIG. 4, when the fixing tabs 440 are inserted in a vertical direction into the fixing slots 430, coupling between the battery cell 100 molded by the outer frame 410 and the top case 420 may be improved.

Meanwhile, the fixing slots 430 may be formed by injection-molding using a guide pin when the outer frame 410 is formed. Similarly, the fixing tabs 440 may also be formed using a mold structure such as a guide groove.

Figure 5:
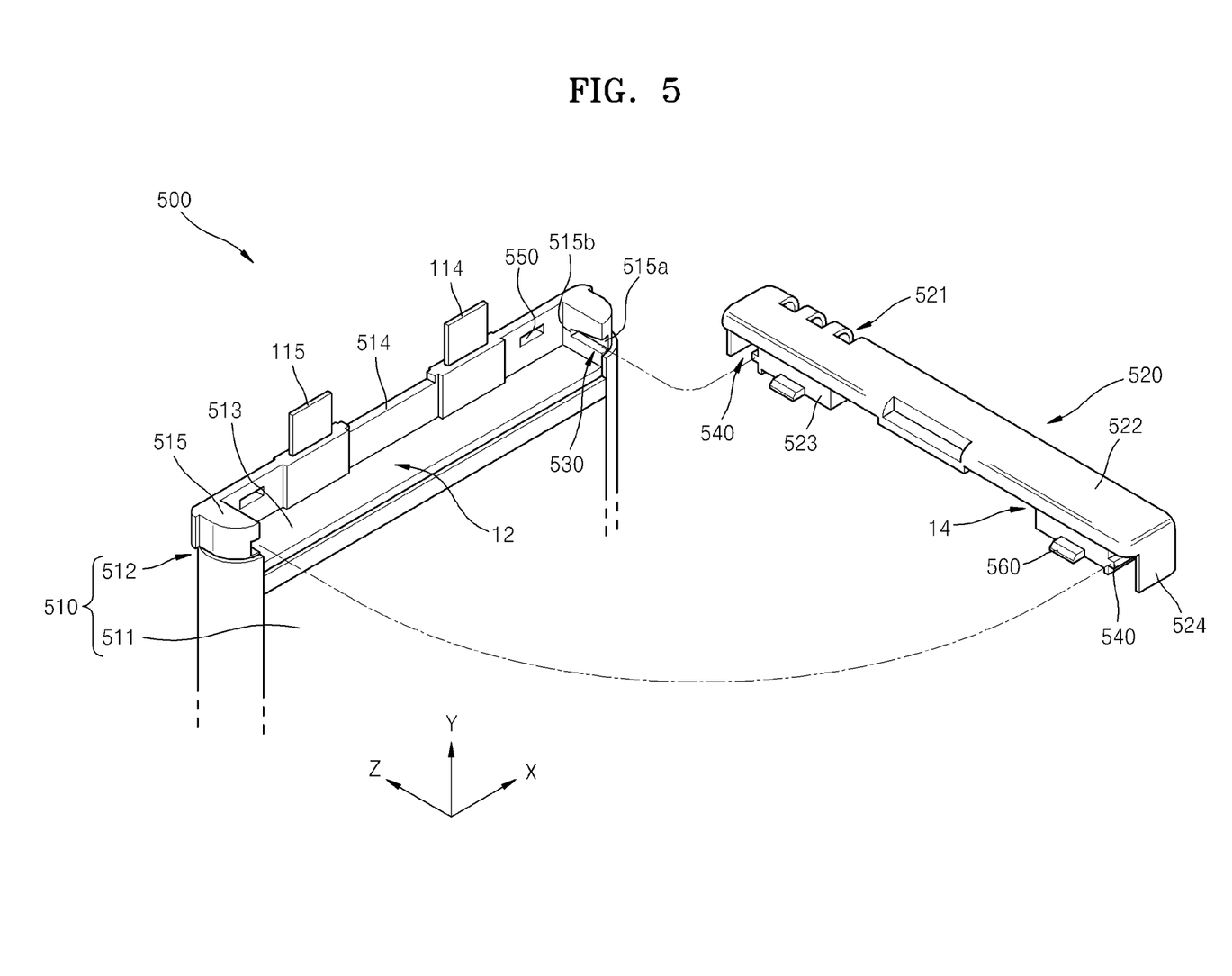
FIG. 5 is an exploded perspective view illustrating a part of a battery pack, according to another embodiment of the present invention.

FIG. 5 is an exploded perspective view illustrating a part of a battery pack 500, according to another embodiment of the present invention.

Hereinafter, only parts related to the main characteristics of the embodiments of the present invention will be mainly described.

Referring to FIG. 5, the battery cell 100 (see FIG. 1) is molded by an outer frame 510 formed by injection-molding using a polymer resin.

The outer frame 510 includes a first portion 511 covering the front, rear, and side surfaces of the battery cell 100 and a second portion 512 covering the upper end portion of the battery cell 100. The second portion 512 of the outer frame 510 is formed to cover the upper end portion of the battery cell 100 in which the ends of the positive electrode tap 114 and the negative electrode tap 115 are exposed.

The second portion 512 of the outer frame 510 includes a cavity 12 defined by a bottom portion 513 covering the upper end portion of the battery cell 100, first side walls 514 formed from long side edges of the bottom portion 513 and formed in a direction perpendicular to the bottom portion 513, and a second side wall 515 formed from short side edges of the bottom portion 513 and formed in the direction perpendicular to the bottom portion 513.

A plurality of channels 530 may be formed in both the second side walls 515 opposite to each other. The channels 530 are formed to a predetermined depth from inlets 515a of the second side walls 515 in a thickness direction of the battery cell 100. The channels 530 may have a tapered shape in which widths thereof decrease toward ends 515b from the inlets 515a of the second side walls 515.

The top case 520 includes a top portion 522 in which a plurality of external terminal holes 521 are formed. A cavity 14 is defined by first side walls 523 formed from long side edges of the top portion 522 at right angles toward the battery cell 100, and second side walls 524 formed from short side edges of the top portion 522 at right angles toward the battery cell 100.

A plurality of runners 540 are formed on side surfaces of the first side walls 523 of the top case 520, wherein the runners 540 are coupled to the channels 530. The runners 540 may be formed covered by the second side walls 524 of the top case 520. The runners 540 may be formed to correspond to the channels 530 formed in the second side walls 515 of the outer frame 510 when the battery cell 100 entirely molded by the outer frame 510 and the top case 520 are coupled to each other.

The runners 540 may have a shape corresponding to that of the tapered channels 530 when the runners 540 and the channels 530 are to be sliding-coupled to each other.

Accordingly, when the runners 540 formed on the side surfaces of the first side walls 523 of the top case 520 are inserted into the channels 530 formed in the second side walls 515 of the outer frame 510 in a horizontal direction (z-axis direction), coupling between the battery cell 100 molded by the outer frame 510 and the top case 520 may be improved.

The channels 530 may have a shape in which widths thereof decrease toward the ends 515b from the inlets 515a of the second side walls 515, thereby enabling wedge coupling between the channels 530 and the runners 540.

Meanwhile, when the channels 530 and the runners 540 are coupled to each other, in order to further increase the coupling between the battery cell 100 molded by the outer frame 510 and the top case 520, a plurality of fixing slots 550 may be formed in the first side walls 514 of the second portion 512 of the outer frame 510, and a plurality of fixing tabs 560 that may be respectively engaged with the fixing slots 550 may be formed on outer surfaces of the first side walls 523 of the top case 520.

As such, the plurality of fixing slots 550 are formed in the first side walls 514 of the outer frame 510, the plurality of fixing tabs 560 are formed on the outer surfaces of the first side walls 523 of the top case 520, and the fixing slots 550 and the fixing tabs 560 are formed to correspond to each other.

Thus, when the runners 540 are coupled to the channels 530 in a horizontal direction, the fixing tabs 560 are inserted into the fixing slots 550, thereby enabling double-coupling between the battery cell 100 entirely molded by the outer frame 510 and the top case 520.

The above-described battery pack of the present invention may be simply manufactured. In addition, reliability of the coupling between the battery cell molded by an outer case and a top case may be increased.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A polymer type battery comprising:
a polymer cell having a positive tap and a negative tap adjacently extended outwardly from inside a same end of the polymer cell in parallel;
a top case;
a frame having a first area surrounding four peripheral sides of the polymer cell, and a second area for locating the top case, the second area being separate from the first area, the frame being molded to form a single component comprising the first and second areas, the positive tap and the negative tap of the polymer cell extend from inside the first area having the polymer cell to beyond the second area of the frame to physically contact a protection circuit module; and
first and second engaging elements coupling the top case to second area of the frame, the top case covering the second area and the protection circuit module, the first engaging element having a fixing slots on the top case, and the second engaging element having a fixing tabs extending from the second area of the frame such that the fixing slots receive the fixing tabs when the top case is coupled to the frame, the fixing slots and fixing tabs being asymmetrically disposed with respect to a central axis of the top case and frame.

2. The polymer type battery as set forth in claim 1, the fixing tabs protruding in a direction perpendicular to a direction in which the battery cell is vertically positioned.

3. A polymer type battery comprising:
a polymer cell having a positive tap and a negative tap adjacently extended outwardly from inside a same end of the polymer cell in parallel;
a top case;
a frame having a first area surrounding four peripheral sides of the polymer cell, and a second area for locating the top case, the second area being separate from the first area, the frame being molded to form a single component comprising the first and second areas, the positive tap and the negative tap of the polymer cell extend from inside the first area having the polymer cell to beyond the second area of the frame to physically contact a protection circuit module; and
first and second engaging elements coupling the top case to second area of the frame, the top case covering the second area and the protection circuit module, the first engaging element having fixing tabs on the top case, and the second engaging element having fixing slots in the second area of the frame and the fixing slots receive the fixing tabs when the top case is coupled to the frame, the fixing slots and fixing tabs being asymmetrically disposed with respect to a central axis of the top case and frame.

4. The polymer type battery as set forth in claim 1, the second engaging element being located on a sidewall of the frame in the second area.

5. The polymer type battery as set forth in claim 3, the first engaging element of the top case being located on a sidewall of the top case.

6. A polymer type battery comprising:
a polymer cell having a positive tap and a negative tap adjacently extended from a same end of the polymer cell in parallel;
a top case;
a frame having a first area surrounding four peripheral sides of the polymer cell, and a second area for locating the top case, the second area being separate from the first area, the frame being molded to form a single component comprising the first and second areas, the positive tap and the negative tap of the polymer cell extend from the polymer cell beyond the second area of the frame to physically contact a protection circuit module;
first and second engaging elements coupling the top case to second area of the frame, the top case covering the second area and the protection circuit module, the first engaging element having fixing tabs on the top case, and the second engaging element having fixing slots in the second area of the frame and the fixing slots receive the fixing tabs when the top case is coupled to the frame; and a pair of runners formed in opposite end sidewalls of the top case and a corresponding pair of channels disposed in the second area and formed in opposite end sidewalls thereof, the runners slidably engaging the channels when the top case is mounted on the second area of the frame.

7. The polymer type battery as set forth in claim 3, the fixing tabs protruding in a direction perpendicular to a direction in which the polymer cell is vertically positioned.

* * * * *